Patented May 15, 1951

2,552,872

UNITED STATES PATENT OFFICE 2,552,872

ACYLATION WITH CONJUGATED DIENE ACIDS

Leon Shechter, East Orange, N. J., assignor, by mesne assignments, to Union Carbide and Carbon Corporation, a corporation of New York No Drawing. Application November 24, 1945, Serial No. 630,693

16 Claims. (Cl. 260—405)

It is known that drying properties can be imparted to castor oil by dehydrating to remove the hydroxyl group in the acid chain structure and thus provide a conjugated double bond system. The present invention accomplishes the end of imparting drying properties to castor oil by an esterification of the hydroxyl group by means of a monocarboxylic acid having conjugated double bonds and one of the double bonds in conjugation with the acid carbonyl, such as sorbic acid. The so-esterified castor oil is much superior to dehydrated castor oil and compares with tung and similar oils in speed of drying; moreover, dried films of the product show good adhesion, flexibility and water resistance.

It has been further found that marked improvements follow in a slow drying oil, such as a raw or alkali-refined linseed or soya bean oil, from introducing castor oil into the slow drying oil and esterifying by means of a conjugated mono-acid as defined. Unexpectedly good drying properties characterize the slow drying oils so treated such as to make them competitive with the more expensive naturally occurring conjugated oils. They are better in this respect than slow drying oils reacted with glycerol, to cause ester interchange and provide free hydroxyls equivalent in amount to the castor oil hydroxyls, and then esterified with sorbic acid. The results are the more surprising because the hardness of the dried oil film is not decreased by the introduction of castor oil; normally, castor oil additions not only give softened films, but there is a tendency for the castor oil to sweat out and develop surface tack on aging, and this tendency is likewise eliminated.

Conjugated double bonds or diene monoacids that serve the purpose of this invention are those having from 2 to 4 conjugated double bonds (apart from a terminal group) and one of these bonds in conjugation with the carbonyl of the carboxyl group as represented by the skeletal structural formula

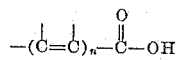

wherein $n$ is 2 to 4 and each of the indicated free valence bonds is satisfied by hydrogen, an alkyl group, an alkenyl group or an aryl group; sorbic acid has been found particularly effective, and other acids of primary interest include β-vinyl-acrylic, octatrien-(2,4,6)-oic, decatetraen-(2,4,6,8)-oic, and β-styryl-acrylic; but α-methyl-sorbic, α-ethyl-sorbic, γ-ε-dimethyl-sorbic, β-δ-dimethyl-sorbic, α-methyl-γ-benzal-crotonic, α-ethyl-δ-phenyl-α-γ-butadiene-α-carboxylic, 2,6-dimethyl-octadien-(4,6)-oic, 2,6-dimethyl-decatrien-(2,6,8)-oic-(10), etc., are also useful.

Likewise acids having the cross-conjugate skeletal chain structure

wherein the indicated free valences are satisfied by hydrogen, alkyl groups, alkenyl groups or aryl groups come within the definition of compounds comprised by this invention; examples are α-β-di-isopropylidenpropionic, α-vinyl-cinnamic, α-isopropenyl-cinnamic, α-isopropenyl-furfural-acetic and α-isopropenyl-cinnamenyl-acrylic acids.

In place of castor oil the free acid of such an oil or ricinoleic acid can be used in whole or in part, and after treatment with sorbic or equivalent acid, the product can be esterified with a polyhydric alcohol, such as a glycol or polyglycol, a glycerol or polyglycerol, an erythritol or pentaerythritol, sorbitol, mannitol, a trimethylolmethane, a polyhydroxyethyl benzene, etc. to yield the properties desired. Likewise equivalents of castor oil and its acids for this invention are such hydroxylated natural oils and their acids that are prepared synthetically by oxidation, reaction with hypochlorous acid, etc. (See patent to Ralston and Bauer, 2,033,538, March 10, 1936; "Varnish Making" (1940), pp. 32, 33 (Chemical Publishing Co., N. Y.); Jour. Chem. Soc. (London), 1943, p. 37.)

Drying oils that can be treated by introducing castor oil, or its free acid, and then reacting with sorbic acid, etc., are particularly the slow-drying oils having one or more double bonds but not in conjugation, such as linseed, soya bean, perilla, and similar vegetable and fish oils, though fast drying conjugated oils, like tung and oiticica, are also capable of treatment in accordance with this invention. In place of the oils, just as with castor oil, there can be substituted their fatty acids or monocarboxylic acids separable by hydrolysis from the oils and having from 12 to 22 carbon atoms in the chain, such as lauric, myristic, palmitic, stearic, linoleic, linolenic, oleic, eleostearic, licanic, clupadonic or the mono- or di-glycerides or other partial alcohol esters of these acids; and the products obtained by mixture with castor oil or its free acid and reaction with sorbic or equivalent acid can then be esterified with a polyhydric alcohol.

Useful products are obtained with any proportion of a diene acid ranging from about 2 per cent of the acid based on the weight of castor oil to an excess of the acid for esterifying the free hydroxyl groups; preferably enough acid is included to esterify the major portion of the hydroxyls. The percentage addition of castor oil to a slow-drying or other oil is likewise subject to wide variation; the results, however, become marked when the castor oil is about 5 to 50 per cent by weight of the linseed or other oil.

Reaction temperatures are preferably kept in the neighborhood of 200° C. though they can range as high as 300° C. without impairment. With low temperatures there is less volatilization and loss of the diene acid. Closed systems for carrying out the reaction can be employed and pressures can be applied. Catalysts and inhibitors can be added for controlling the reactions. Moreover, the reactions can be carried out in solvents for added control, and the solvents can remain when the products are intended for coatings.

The following examples are illustrative:

Example 1

| | Grams |
|---|---|
| Castor oil | 125 |
| Sorbic acid | 45 |
| and | |
| Hydroquinone (inhibitor) | 2 | where charged into a closed vessel and blanketed with carbon dioxide. The mass was agitated while the temperature was raised to 175° C. in 25 minutes; the temperature was gradually raised to 220° C. during the next 70 minutes and held at this temperature for about 4 hours. The oily product was discharged after cooling and found to have an acid number of 48.7; it was pale in color and had drying properties comparable to tung oil.

Example 2

In this experiment a solvent was used as a control medium and a catalyst was added.

| | Grams |
|---|---|
| Castor oil | 382 |
| Sorbic acid | 112 |
| p-Toluene sulfonic acid | 0.6 |
| and | |
| Xylene | 400 | were heated to reflux and the water separated. After 13 hours' heating at the reflux temperature (145°–147° C.), 500 grams of amyl benzene were added and xylene distilled off until the reflux temperature reached 180° C.; after 44 hours' heating, the mass was cooled and discharged. The product contained 55 per cent non-volatiles and had an acid number of 2.03. It was usable as such as a varnish and gave films drying with about the speed of tung oil with the usual amount of drier addition.

Example 3

Linseed oil was mixed with 47 per cent of its weight of castor oil and subjected to treatment by charging into a closed kettle

| | Grams |
|---|---|
| Linseed oil | 974 |
| Castor oil | 458 |
| Sorbic acid | 134.4 |
| Xylene | 100 |
| Ca Nuodex solution | 8.6 |

(The Nuodex solution was calcium naphthenate in xylene and in amount to give 1 per cent calcium calculated as metal.)

The mass was heated under $CO_2$ and agitated to 220°–230° C. and held for 18 hours to an acid number of 9.1, whereupon the solvent was extracted by vacuum distillation to 240° C. at 27.5 inches of mercury. In the reaction there was an interchange of acid groups between the oils to form mixed esters; the calcium naphthenate was included to function as a catalyst for promoting the ester-interchange. The product could be used as a varnish as before with film characteristics of hardness and absence of sweating or development of tack.

Example 4

A composition containing 30 per cent of castor oil (based on the natural oil) comprising

| | Grams |
|---|---|
| Refined linseed oil | 1000 |
| Castor oil | 300 |
| Sorbic acid | 88 |
| Xylene | 80 |
| Calcium Nuodex solution | 11.8 | was maintained under a $CO_2$ atmosphere, agitated and heated to reflux or 230° C. Water of esterification was separated continuously and the upper xylene layer in the condenser was returned to the kettle. The refluxing was maintained for 18 hours whereupon xylene was distilled off under vacuum to a pot temperature of 250° C. at a vacuum of 28 inches mercury. The final acid number was 8.75, the color was 6 (Gardner) and the viscosity I (Gardner-Holdt).

Example 5

A 20 per cent castor oil composition (based on the weight of linseed oil) was made by reacting

| | Grams |
|---|---|
| Alkali refined linseed oil | 1000 |
| Castor oil | 200 |
| Sorbic acid | 58.6 |
| Xylene | 70 |
| Calcium Nuodex solution | 11.2 | under an atmosphere of carbon dioxide, agitated and heated to a reflux temperature of 230° C. with a continuous return of the xylene to the kettle as before during a refluxing period of 18 hours. Vacuum desolvation was applied to a pot temperature of 250° C. at 28 inches (mercury) vacuum. The final acid number was 7.36, the color was 9 (Gardner) and the viscosity was F (Gardner-Holdt).

Example 6

For the higher concentrations of sorbic acid, castor oil can in part be substituted by glycerol. To illustrate

| | Grams |
|---|---|
| Linseed oil | 1170.6 |
| Castor oil | 248.6 |
| Sorbic acid | 134.4 |
| Glycerol | 18.1 |
| Ca Nuodex solution | 9.1 |
| Xylene | 100.0 | were heated to reflux (225°–230° C.) under $CO_2$ and agitation, with removal of water of esterification, for 18 hours to an acid number of 7.02; the solvent was removed by heating to 240° C. at 28 inches mercury vacuum.

Example 7

In order to obtain comparative results on the effect of the inclusion of castor oil in conjunction with a slow-drying oil and a diene acid, the foregoing Example 6 was repeated using in one instance (A) 10 per cent of castor oil and in another instance (B) 5 per cent castor oil; a standard (C) for comparison was made without any castor oil.

For preparing the treated oil A, a still was charged with

| | Grams |
|---|---|
| Linseed oil | 1596 |
| Castor oil | 159 |
| Sorbic acid | 336 |
| Glycerol | 107.8 |
| Ca Nuodex in xylene | 11.15 |
| Xylene | 100 |

The mass was heated to reflux (222° C.) under $CO_2$, held for 13 hours and vacuum distilled to 240° C. The product had an acid number of 6.08, viscosity J (Gardner-Holdt) and color 5L (Hellige).

The oil B was made from

| | Grams |
|---|---|
| Linseed oil | 1672 |
| Castor oil | 84 |
| Sorbic acid | 336 |
| Glycerol | 115.3 |
| Ca Nuodex in xylene | 11.15 |
| Xylene | 100 | heated to reflux (225°–235° C.) held for 13 hours and vacuum distilled to 240° C. The oil had an acid number of 5.43, viscosity J (Gardner-Holdt) and color 4 (Hellige).

The standard for comparison was prepared from

| | Grams |
|---|---|
| Linseed oil | 1756 |
| Glycerol | 123.7 |
| Ca Nuodex in xylene | 11.15 | heated to 200° C. under $CO_2$ for ester-interchange. To the batch was added

Sorbic acid _____gms__336 and esterification continued at 240° F. to an acid number of 1.55; the viscosity was U to V and the color 2 (Hellige).

From each of the oils varnishes were made by cooking with an equal weight of a p-phenyl-phenol-formaldehyde resin to 540° F., holding for about 15 minutes, checking by the addition of another equal weight portion of the oil, regaining 540° F. and holding for 30–40 minutes. The heat was then removed and enough petroleum thinner (Solvesso #2) added to give a solution of viscosity E (Gardner-Holdt). In each varnish naphthenate driers were incorporated in amounts equivalent to 0.44 per cent lead and 0.022 per cent cobalt based on the solids content (about 52 per cent). Films flowed on porcelain had the following drying times:

| Time | A—10% C. O. | B—5% C. O. | S—0% C. O. | Rating |
|---|---|---|---|---|
| Hours | | | | |
| ¼ | D. F. | D. F. | D. F.. | A=B=S |
| ½ | T— — | T— — | T— — | A=B=S |
| ¾ | T— | T— — | T— — | A>B=S |
| 1 | T+ | T | T | A>B=S |
| 2¼ | PT+ | PT | T+ | A>B>S |
| 3 | PT++ | PT+ | PT | A>B>S |

D. F.=dust free; T=tack-free on light touch; PT=tack-free to finger with heavy pressure; +=better than; —=worse than; >=superior to.

From the data an improvement in drying occurred with the increase in castor oil (C. O.) content.

The foregoing examples are directed to sorbic acid as illustrative of the diene acids, but any of the other mentioned diene acids having the structural formulae indicated can be substituted in equivalent proportions to secure like effects.

Also linseed oil is selected as typifying a non-hydroxylated drying oil, but other fatty oils of this type (or their equivalents obtained by esterification of their acids with a polyhydric alcohol) can be be employed in a similar manner.

The oils or esters of this invention can be made into coating compositions, like the natural oils used for the purpose, in conjunction with various types of resins, such as natural resin, synthetic resins, cellulose derivatives, etc., or as oil components in the preparation of oil-modified alkyd, phenol-aldehyde and other resins. Driers and volatile solvents in general use for oil coating compositions are effective with the esters herein described.

The compositions can be applied as coatings or as adhesive layers on metal, wood, paper, etc. or used as binders for fillers, such as cork in making linoleum, etc.

What is claimed is:

1. Esterification product of a diene monocarboxylic acid having conjugated double bonds with one of these bonds in conjugation with the carboxyl group and of a hydroxylated member selected from the group consisting of fatty oils containing hydroxy fatty acid radicals and the hydroxy fatty acids of such fatty oils, the acid hydroxy groups of said member being esterified by said diene acid.

2. A castor oil reaction product in which the hydroxy groups of the hydroxy acid radicals in the castor oil are esterified by a diene monocarboxylic acid having conjugated double bonds, and one of these bonds in conjugation with the carboxyl group.

3. A castor oil reaction product in which the hydroxy groups of the hydroxy acid radicals in the castor oil are esterified by sorbic acid.

4. Ester of a member of the group consisting of hydroxylated fatty oil and their hydroxy fatty acids, in which member the hydroxy groups of the hydroxy acid radicals are esterified by sorbic acid.

5. Reaction product of a non-hydroxylated drying oil, of a hydroxylated member of the group consisting of natural oils containing hydroxy substituents in the fatty acid radical and their acids, and of a diene monocarboxylic acid having conjugated double bonds and one of these bonds in conjugation with the acid carbonyl, said reaction product having hydroxy substituents of the hydroxylated member esterified by said diene acid.

6. Polyhydric alcohol mixed esters of a reaction product of a non-hydroxylated drying oil fatty acid, of a hydroxylated member of the group consisting of natural oils containing hydroxy substituents in the fatty acid radical and their acids, and of a diene monocarboxylic acid having conjugated double bonds and one of these bonds in conjugation with the acid carbonyl, said mixed ester having hydroxy substituents of the hydroxylated member acylated by said diene acid.

7. Reaction product of a non-hydroxylated drying oil, of castor oil, and of a diene monocarboxylic acid having conjugated double bonds and one of these bonds in conjugation with the acid carbonyl, said product containing castor oil acid radical hydroxyls esterified by said diene acid.

8. Reaction product of linseed oil, of castor oil and of a diene monocarboxylic acid having conjugated double bonds and one of these bonds in conjugation with the acid carbonyl, said product containing castor oil acid radical hydroxyls esterified by said diene acid.

9. Glycerol ester of sorbic acid, castor oil acid and a natural oil fatty acid, said ester having the acid radical hydroxyl of the castor acid esterified with sorbic acid.

10. Glycerol ester of sorbic acid, castor oil acid and linseed oil fatty acid, said ester having the acid radical hydroxyl of the castor acid esterified with sorbic acid.

11. Product according to claim 1 wherein the diene acid constitutes at least 2 per cent by weight of the hydroxylated ingredient.

12. Product according to claim 6 wherein the diene acid constitutes at least 2 per cent by weight of the hydroxylated acid calculated as the glyceride and the latter ranges from 5 to 50 per cent by weight of the natural oil acid calculated as the glyceride.

13. Method which comprises reacting a diene monocarboxylic acid having conjugated double bonds and one of these in conjugation with the acid carbonyl and castor oil at about 175° to 220° C.

14. Method which comprises reacting a diene monocarboxylic acid having conjugated double bonds and one of these in conjugation with the acid carbonyl and castor oil at reflux temperature in the presence of a solvent.

15. Method which comprises reacting a diene monocarboxylic acid having conjugated double bonds and one of these in conjugation with the acid carbonyl, castor oil and a natural fatty oil in the presence of a solvent at reflux temperature and an ester-interchange catalyst.

16. Method which comprises reacting a diene monocarboxylic acid having conjugated double bonds and one of these in conjugation with the acid carbonyl, castor oil, a natural fatty oil and glycerol, said diene acid being present in amount sufficient to esterify acid radical hydroxyls of the castor oil, in the presence of a solvent at reflux temperature and an ester-interchange catalyst.

LEON SHECHTER.

REFERENCES CITED

The following references are of record in the file of this patent:

UNITED STATES PATENTS

| Number | Name | Date |
|---|---|---|
| 1,744,596 | Van Loon | Jan. 21, 1930 |
| 2,141,546 | Strain | Dec. 27, 1938 |
| 2,310,395 | Carruthers | Feb. 9, 1943 |
| 2,349,546 | Ginn | May 23, 1944 |
| 2,381,885 | Sauer | Aug. 14, 1945 |
| 2,381,888 | Agre | Aug. 14, 1945 |
| 2,420,694 | Barthel | May 20, 1947 |

FOREIGN PATENTS

| Number | Country | Date |
|---|---|---|
| 569,113 | Great Britain | May 4, 1945 |

OTHER REFERENCES

Chemical Abstracts, vol. 35, 3966$^5$ (1941).